United States Patent [19]

Jennrich

[11] 3,936,204

[45] Feb. 3, 1976

[54] TAPE CLAMP

[75] Inventor: Carleton E. Jennrich, St. Paul, Minn.

[73] Assignee: Central Research Laboratories, Inc., Red Wing, Minn.

[22] Filed: Oct. 2, 1974

[21] Appl. No.: 511,244

[52] U.S. Cl. .............................. 403/209; 24/263 A
[51] Int. Cl.² ................... F16G 11/00; A44B 21/00
[58] Field of Search...... 24/243 CH, 243 P, 243 SC, 24/243 B, 263 A, 263 LS, 171, 163 R, 135 A; 403/209, 210, 212

[56] References Cited
UNITED STATES PATENTS

| 1,682,604 | 8/1928 | Disbrow | 24/263 A |
| 1,758,948 | 5/1930 | Helm | 24/135 A |
| 2,551,636 | 5/1951 | Ratigan | 24/263 A |

FOREIGN PATENTS OR APPLICATIONS

| 1,750,047 | 1/1970 | Germany | 403/209 |
| 5,531 | 5/1885 | United Kingdom | 403/210 |

Primary Examiner—Donald A. Griffin
Attorney, Agent, or Firm—Burd, Braddock & Bartz

[57] ABSTRACT

A clamp for securing a loop in the end of a flat metallic tape of the type used for transmitting linear motion in remote control master-slave manipulators and securing the clamp to another manipulator element which transmits motion to the tape or is moved by force transmitted by the tape. The clamp is characterized by independence of the tape loop from variations in tensile load. The disclosed clamp includes an elongated tubular frame having an intermediate open section in which an anchoring pin or roller is mounted. The free end of the tape being secured is introduced into the end of the frame, passed around the pin or roller in partial peripheral engagement therewith and brought back out through the end of the frame. A tape clamping mechanism adjacent the frame end forces the abutting tape surfaces together against the inside surface of the frame to rigidly secure the tape loop. The clamp may be used to join two tape ends, or to connect a tape to a cable, or to anchor a tape to another manipulator part.

12 Claims, 6 Drawing Figures

U.S. Patent  February 3, 1976  3,936,204
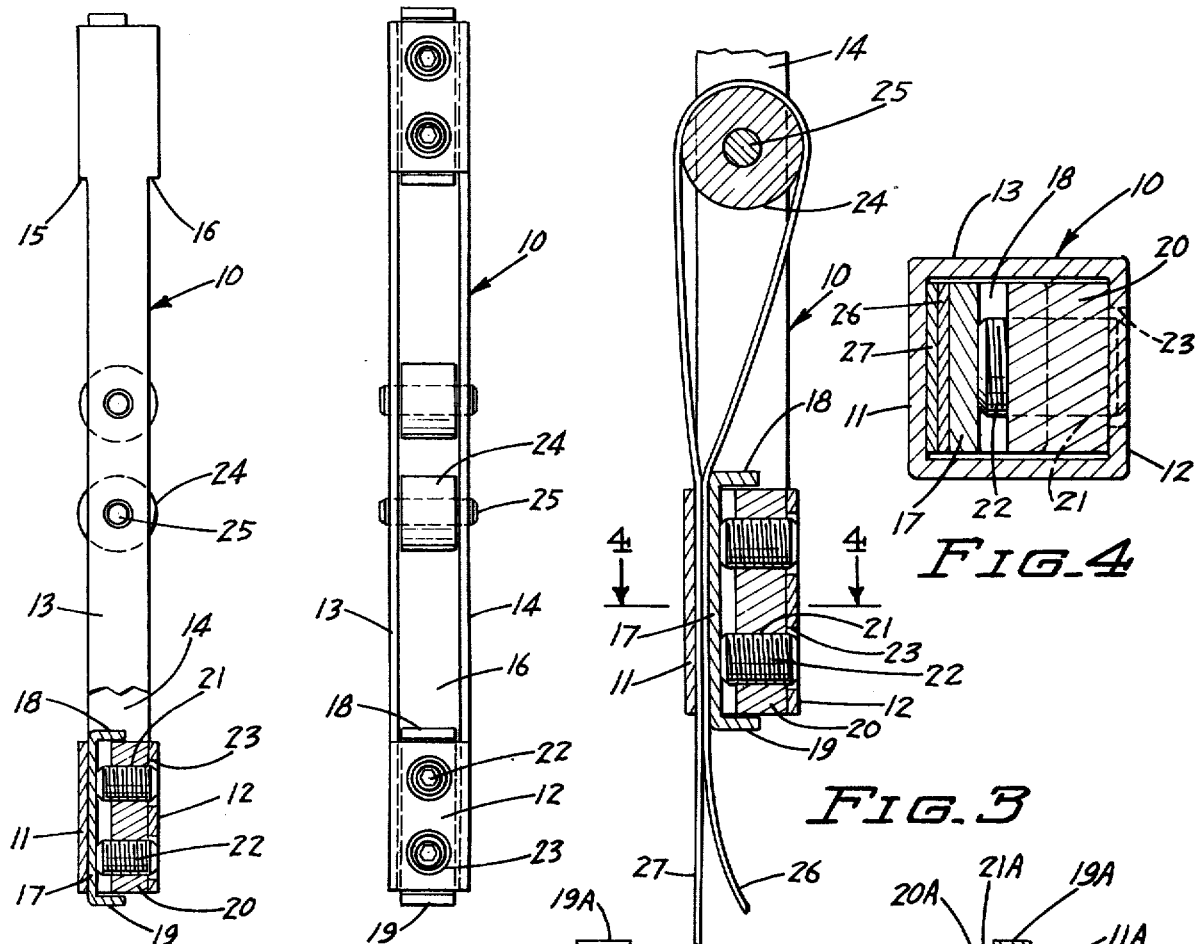
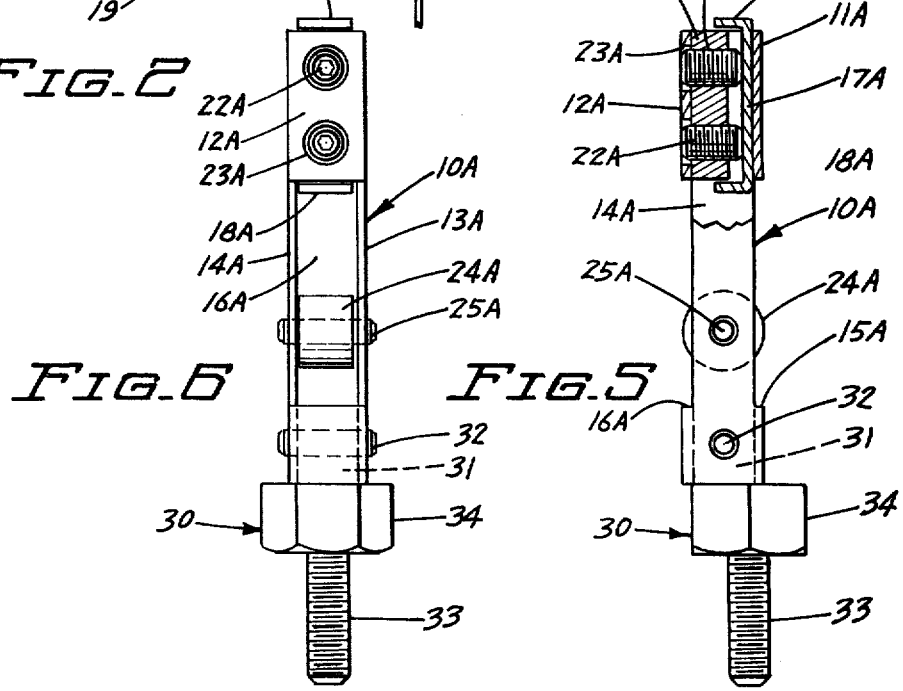

TAPE CLAMP

This invention is directed to clamp means for securing a loop in a flat tape and more particularly to secure a loop in a flat metal tape of the type utilized to transmit linear motions in a remote control master-slave manipulator. The clamp may be utilized to connect two tape ends, to make the transition between a tape and a cable used for transmitting linear motion in a manipulator, or as a termination point for anchoring the end of a tape to another manipulator part intended to be moved through action of the tape or to impart motion to the tape.

The tape clamp of this invention is intended for use in manipulators of the general type shown in Goertz et al U.S. Pat. No. 2,764,301, issued Sept. 25, 1956; Jelatis et al U.S. Pat. No. 3,164,267, issued Jan. 5, 1965; Haaker et al U.S. Pat. No. 3,297,172, issued Jan. 10, 1967; Haaker U.S. Pat. No. 3,425,569, issued Feb. 4, 1969 and others.

As illustrated in these patents, it has been common practice in making a tape junction to pass the free end of the tape around an arcuate loop anchoring member, such as a cylindrical pin of relatively large radius or a roller, either fixed or rotatable, secured to the element with which the desired connection is to be made. Means are then provided for clamping the free end of the tape in face-to-face abutment with the standing portion of the tape at the end of the resulting bight or loop. In such an arrangement, the tensile load is carried by the loop anchoring member. The tape is looped to facilitate initial stringing and tensioning. Because of the inherent stiffness of the tape, a slight bow usually exists in the portions of the tape forming the sides of the loop between the point of engagement with the arcuate anchoring member and the clamping means. Although the tapes are customarily pretensioned prior to clamping, some minimal amount of slack may be present such that when under load, the bowed portions of the tape tend to become straight and with each change of direction the sides of the loop may be subjected to slight flexing which introduces fatigue into the metal which may result in ultimate failure of the connection.

The present invention is directed to tape clamping means for eliminating this potential source of tape failure. This is accomplished by isolating the loop from the load carrying portion of the tape by the clamping means, so as to make the tape loop independent from variations in tensile load. This is done by utilizing an elongated tubular frame having an intermediate open section in which the arcuate loop anchoring member is mounted. The free end of the tape to be secured is introduced into the end of the frame, passed around the arcuate member and then brought back out through the end of the frame where the tape clamp mechanism forces the tape surfaces together against the inside surface of the frame to rigidly secure the loop. The tapes are customarily pretensioned prior to clamping and the slight bowing of the sides of the tape loop may exist, as in the prior art devices. However, because the distance between the arcuate loop anchoring member and clamping surface is fixed, and because the tensile load is now carried by the frame instead of the anchoring member, no flexing of the sides of the loop can occur. As a result, any fatigue due to such flexing is eliminated and this potential source of tape failure is eliminated.

The invention is illustrated by the accompanying drawings in which corresponding parts are identified by the same numerals and in which:

FIG. 1 is a side elevation, partly broken away and in section, showing one form of clamp adapted for linking together two tape ends;

FIG. 2 is a side elevation showing the tape clamp of FIG. 1 rotated counter-clockwise 90° about its longitudinal axis;

FIG. 3 is a fragmentary sectional view on an enlarged scale of one end of the linking clamp of FIG. 1 showing details of construction thereof and showing a segment of tape rigidly secured in the clamp;

FIG. 4 is a transverse section, further enlarged, on the line 4—4 of FIG. 3;

FIG. 5 is a side elevation, partly broken away and in section, showing a modified form of tape clamp useful for connecting a tape to a cable or for anchoring a tape to another manipulator part; and FIG. 6 is a side elevation showing the alternative form of clamp rotated clockwise 90° about its longitudinal axis.

Referring now to the drawings, and particularly FIGS. 1 through 4, the form of tape clamp for linking together two ends of tape is indicated generally at 10 and comprises an elongated tubular body or frame of rectangular cross-section composed of spaced apart parallel first and third side walls 11 and 12, respectively, joined at their edges by parallel spaced apart second and fourth side walls 13 and 14, respectively. A pair of openings 15 and 16 are provided in the first and third side walls 11 and 12, respectively, of the tubular frame intermediate of its ends leaving an open space between the intermediate portions of the second and fourth frame side wall members 13 and 14 which interconnect the opposite ends of the tubular frame.

A tape clamping mechanism is provided in each opposite end of the tubular housing 10. A preferred form of clamping mechanism, as illustrated, comprises a tape clamp strap comprising a flat plate member 17 of generally rectangular configuration whose width is just slightly less than the width of the inner surface of housing side wall member 11 such that the clamping strap fits with a loose slide fit within the end of the tubular housing. The tape clamp strap is desirably provided with a pair of parallel spaced apart inwardly directed lips or flanges 18 and 19 of width substantially less than the space between the inside surfaces of first and third housing side walls 11 and 12.

A tape clamp nut 20 of generally rectangular configuration is positioned within the end of the tubular housing between the inside surface of housing side wall 12 and clamp strap member 17. Clamp nut 20 is of a width slightly less than the width of the inner surface of housing wall 12 such that it fits with a loose slide fit within the tubular housing. It is of a length just slightly less than the distance between the inside surfaces of clamp strap flanges 18 and 19 such that it is embraced between those flanges with a loose slide fit. Nut 20 is of a thickness sufficiently less than the distance between the inside surface of clamp strap 17 and housing wall 12 to permit the free and easy passage of a double thickness of tape between the outer surface of clamp strap 17 and inner surface of housing wall 11, as shown in FIGS. 3 and 4, and to permit sufficient lateral movement of the nut to enable the clamp strap to be tightened.

Clamp nut 20 is provided with at least one transverse internally threaded passage 21, and desirably a pair of such passages parallel and longitudinally spaced apart, extending through the thickness of the nut and adapted to receive screws 22. Housing side wall 12 is provided with openings 23 corresponding in number to threaded passages 21, in substantial registry therewith and of slightly larger diameter to permit the passage of screws 22 and to permit the tightening and loosening of screws 22 for operation of the clamping mechanism. Screws 22 are desirably recessed set screws of length such that when tightened they protrude into openings 23 sufficient to prevent longitudinal displacement of the clamping mechanism relative to the housing, but without protruding beyond the outer surface of housing side wall 12 where they might be subject to acccidental loosening or dislodgment. Other equivalent tape clamping means may be utilized, such as opposing wedges fitted into the tubular body.

An arcuate tape loop anchoring member, here shown as a roller 24 of diameter substantially equal to the outside dimensions of the tubular housing, is positioned in the space formed by openings 15 and 16. Roller 24 is supported by a pin 25 extending between the second and fourth housing side walls 13 and 14, the ends of pin 25 being secured in the side walls. Roller 24 is provided with a flat peripheral surface for engagement by a tape loop. Roller 24 may be fixed or journaled for rotation, as desired. Roller 24 is spaced from the clamping mechanism a sufficient distance that a loop of tape may be formed around the roller without a sharp reverse bend in the tape. Instead of a roller, a fixed pin of correspondingly large radius or a semi-cylindrical body positioned for peripheral engagement by the tape loop or equivalent arcuate members may be used.

In use, as best seen in FIG. 3, the clamp is initially opened by loosening screws 22 to permit sufficient separation between the outer surface of clamp strap 17 and the inner surface of housing wall 11 to permit free passage of a length of tape therethrough. The free end 26 of tape 27 is passed between housing wall 11 and clamp strap 17 sufficiently far to permit the tape to be passed through the intermediate openings 15 and 16 in the clamp frame, passed around roller 25 in partial peripheral engagement therewith, and then passed through the clamping mechanism once again between the standing portion of the tape initially threaded through the clamp and the surface of clamp strap 17. A sufficient excess of tape is passed through the clamping mechanism to permit the end to be grasped for tensioning of the tape prior to tightening of the clamping means.

As seen in FIGS. 3 and 4, as screws 22 are threaded into passages 21, the inner ends of the screws bear against the inner surface of clamp strap 17 forcing the clamp strap into engagement with the abutting face-to-face portions of the tape and housing wall 11. At the same time, clamp nut 20 is forced in the opposite direction into engagement with the inner surface of housing wall 12. The tensile load on the tape is carried by the clamp frame by virtue of the engagement of the end of the tape loop between the clamp strap and frame wall. No load is carried by roller 24. The position of roller 24 is fixed relative to the clamping mechanism such that no flexing of the sides of the loop between these members can occur. If through use of the manipulator the clamping mechanism becomes loosened slightly such that some slippage may occur between the abutting tape surfaces, force exerted on the standing portion 27 of the tape transmitted around roller 24 to the free end 26 of the tape would urge movement of the free end in the opposite direction from the standing portion in tight frictional engagement such that any substantial tape movement and resulting failure are virtually impossible.

In the embodiment of FIGS. 1 and 2, the clamping mechanism comprised of the clamp strap 17, clamp nut 20 and screws 22, and roller 24 are duplicated at the opposite end of the frame, the elements being disposed in mirror image relation to the corresponding elements at the other end of the frame. In the preferred embodiment, the tubular frame is formed from extruded stainless steel for strength and rigidity. The clamp strap is composed of brass for good clamping engagement with the surface of the tape which is ordinarily formed from stainless steel. The clamp nut is formed from aluminum for tight engagement of screws 22 in the threaded passages and tight engagement with the housing wall.

Referring now to FIGS. 5 and 6, there is shown an alternative embodiment of tape clamp adapted for use for anchoring an end of tape to a casting or similar manipulator part, for making a transition to another form of linear motion transmission means, such as a cable, or the like. This modified form of clamp comprises an elongated tubular housing, indicated generally at 10A. The clamping mechanism at one end of housing 10A is identical in all respects to that already described, as is the roller. The elements of the clamping mechanism and roller are identified by the same numerals followed by suffix A. The overall length of housing 10A is somewhat shorter, however, and instead of having clamping mechanisms at both ends, the opposite end is provided with a fitting, indicated generally at 30.

One end of fitting 30 is a shank 31 of configuration conforming to the inside of the tubular housing and adapted to be inserted telescopically therein and rigidly secured as by means of a pin 32 or equivalent fastening means. The opposite end 33 of fitting 30 is externally threaded and adapted, for example, for engagement with a turnbuckle secured to the end of a cable, for engagement with a casting forming part of a manipulator, or for engagement with other manipulator elements. It will be noted that the longitudinal axis of threaded fitting end 33 is in substantial longitudinal alignment with the center line of the inside surface of frame side wall 11A at the opposite end of the tubular housing such that the force transmitted between the tape secured in the clamp and the part to which the clamp is connected is in a straight line path without deflection. Desirably fitting 30 is provided with a polygonal intermediate portion 34 to facilitate engagement of the clamp with internally threaded fastening means engaging threaded end 33.

It is apparent that many modifications and variations of this invention as hereinbefore set forth may be made without departing from the spirit and scope thereof. The specific embodiments described are given by way of example only and the invention is limited only by the terms of the appended claims.

The embodiments of the invention in which an exclusive property or privilege is claimed are defined as follows:

1. A clamp for securing a loop in a flat tape, said clamp comprising:
   A. an elongated frame of rectangular cross-section having first through fourth side walls,
   B. a pair of parallel spaced apart second and fourth side wall members interconnecting the opposite ends of the frame and two longitudinally spaced apart pairs of first and third side wall members interconnecting the opposite ends of the second and fourth side wall members and defining a pair of openings in the opposite first and third side walls of said frame intermediate of the ends thereof, C. tape clamping means disposed within one end of said frame adapted for face-to-face abutment with the inside surface of the first frame side wall, said clamping means comprising:
 1. a flat rectangular clamp strap plate member having a pair of inwardly directed flanges at its opposite ends and disposed within one end of said frame adapted for face-to-face abutment with the inside surface of the first frame side wall,
 2. a tape clamp nut adapted for face-to-face abutment with the inside surface of the third frame side wall, said clamp nut having at least one internally threaded passage extending through said nut,
 3. at least one opening in said third side wall in substantial registry with the passage in said clamp nut, and
 4. a screw extending through said passage in said clamp nut and said last named opening in said frame side wall, the inner end of said screw engaging said clamp strap, D. an arcuate tape loop anchoring member supported in the openings in the frame first and third side walls between the second and fourth side walls on an axis perpendicular thereto, and E. means at the opposite end of said frame for connecting the clamp to another element.

2. A clamp according to claim 1 further characterized in that said arcuate tape anchoring member is a roller.

3. A clamp according to claim 1 further characterized in that said arcuate tape anchoring member is a cylindrical pin of relatively large radius.

4. A clamp according to claim 1 further characterized in that said clamp nut is a rectangular block embraced between the flanges of said clamp strap.

5. A clamp according to claim 1 further characterized in that said means for connecting the clamp to another element comprises a clamp strap, clamp nut, screw and arcuate tape loop anchoring member in duplication of those at the opposite end of the frame and disposed in mirror image relation, whereby the clamp may be connected to a loop of another tape end.

6. A clamp according to claim 1 further characterized in that said means for connecting the clamp to another element comprises an anchoring fitting, one end of said fitting being rigidly secured to the end of the frame opposite from the tape clamping means and the opposite end of said fitting being externally threaded.

7. A clamp according to claim 6 further characterized in that the center lines of said threaded fitting end and the inside surface of said first frame side wall are in substantial longitudinal alignment.

8. A clamp for securing a loop in the end of a linear motion-transmitting tape in a master-slave remote control manipulator, said clamp comprising:
A. an elongated frame of rectangular cross-section having first through fourth side walls, B. a pair of parallel spaced apart second and fourth side wall members integral with and interconnecting the opposite ends of the frame and two longitudinally spaced apart pairs of first and third side wall members integral with and interconnecting the opposite ends of the second and fourth side wall members and defining a pair of openings in the opposite first and third side walls of said frame intermediate of the ends thereof, C. a tape clamp strap disposed within one end of said frame adapted for face-to-face abutment with the inside surface of the first frame side wall, said clamp strap comprising a flat rectangular plate member having a pair of inwardly directed flanges at its opposite ends, D. a tape clamp nut embraced between the flanges of said clamp strap adapted for face-to-face abutment with the inside surface of the third frame side wall, said clamp nut having at least a pair of parallel longitudinally spaced apart internally threaded passages extending through said nut perpendicular to said strap plate member, E. openings in said third frame side wall corresponding in number with and in substantial registry with the passages in said clamp nut, F. a screw extending through each of said passages in said clamp nut and said last named openings in said frame side wall, the inner end of said screw engaging said clamp strap, G. a roller supported in the openings in the frame first and third side walls between the second and fourth side walls, said roller being mounted adjacent to but spaced from the clamp strap and clamp nut in the end of the frame, and H. means at the opposite end of said clamp for connecting the clamp to another manipulator element.

9. A tape clamp according to claim 8 further characterized in that said means for connecting the clamp to another manipulator element comprises a clamp strap, clamp nut, screws and roller in duplication of those at the opposite end of said frame and disposed in mirror image relation thereto, whereby the clamp may be connected to a loop of another linear motion-transmitting tape.

10. A tape clamp according to claim 8 further characterized in that said means for connecting the clamp to another manipulator element comprises an anchoring fitting, one end of said fitting conforming in cross-section to the inside of the end of said clamp frame opposite from the tape clamp strap and nut and being in telescopic engagement therewith and rigidly secured, the opposite end of said fitting being externally threaded, and intermediate means of polygonal cross-section to facilitate rotation of said fitting, whereby the clamp may be connected to a turnbuckle for transition to a linear motion-transmitting cable or anchored to a manipulator casting.

11. A tape clamp according to claim 10 further characterized in that the center lines of said threaded fitting end and the inside surface of said first frame side wall are in substantial longitudinal alignment.

12. A tape clamp according to claim 8 further characterized in that said frame is formed from extruded stainless steel, said clamp strap is composed of brass and said clamp nut is composed of aluminum.

* * * * *